United States Patent
Nakai et al.

(10) Patent No.: US 8,537,653 B2
(45) Date of Patent: Sep. 17, 2013

(54) OPTICAL INFORMATION RECORDING MEDIUM AND DRIVE DEVICE

(75) Inventors: Kenya Nakai, Tokyo (JP); Masayuki Omaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/811,173

(22) PCT Filed: Jul. 25, 2011

(86) PCT No.: PCT/JP2011/004164
§ 371 (c)(1),
(2), (4) Date: Jan. 18, 2013

(87) PCT Pub. No.: WO2012/014429
PCT Pub. Date: Feb. 2, 2012

(65) Prior Publication Data
US 2013/0114385 A1  May 9, 2013

(30) Foreign Application Priority Data

Jul. 30, 2010 (JP) ................. 2010-172393

(51) Int. Cl.
*G11B 7/24* (2013.01)
(52) U.S. Cl.
USPC ............... 369/275.1; 369/284; 369/94
(58) Field of Classification Search
USPC .......... 369/275.1–275.5, 94, 283, 284, 44.26, 369/47.15, 124.01, 100
See application file for complete search history.

(56) References Cited

U.S. PATENT DOCUMENTS

| 7,442,424 | B2 | 10/2008 | Hwang et al. | |
|---|---|---|---|---|
| 8,189,444 | B2 | 5/2012 | Mori et al. | |
| 2003/0228462 | A1* | 12/2003 | Chen | 428/336 |
| 2005/0237912 | A1* | 10/2005 | Kikukawa et al. | 369/275.4 |
| 2005/0254407 | A1* | 11/2005 | Hwang et al. | 369/275.1 |
| 2006/0046013 | A1 | 3/2006 | Bae et al. | |
| 2006/0161942 | A1 | 7/2006 | Kikukawa et al. | |
| 2007/0183289 | A1* | 8/2007 | Fukuzawa et al. | 369/59.11 |
| 2009/0016205 | A1* | 1/2009 | Kikukawa et al. | 369/275.3 |

(Continued)

FOREIGN PATENT DOCUMENTS

| JP | 2003-157573 A | 5/2003 |
|---|---|---|
| JP | 2003-157574 A | 5/2003 |

(Continued)

OTHER PUBLICATIONS

Blu-Ray Disc White Paper 1.C Physical Format Specifications for BD-ROM 5th Edition, 36 pages, Mar. 2007.

(Continued)

*Primary Examiner* — Thang Tran
(74) *Attorney, Agent, or Firm* — Birch, Stewart, Kolasch & Birch, LLP

(57) ABSTRACT

An optical information recording medium includes at least one recording layer, a protective layer that transmits a focused laser beam, and a super-resolution functional layer that changes an optical characteristic in a local region smaller than the diffraction limit determined by the optical performance of the focusing optical system and the wavelength of the laser beam during at least the period of irradiation by the focused laser beam. The maximum thickness (K) between the light incidence surface of the protective layer and the recording layer is 0.083 mm.

13 Claims, 10 Drawing Sheets

(56) References Cited

U.S. PATENT DOCUMENTS

| | | |
|---|---|---|
| 2009/0303850 A1 | 12/2009 | Nakai et al. |
| 2010/0046333 A1* | 2/2010 | Mori et al. .................... 369/47.1 |
| 2010/0118672 A1 | 5/2010 | Yamamoto et al. |
| 2010/0232268 A1* | 9/2010 | Shintani et al. .............. 369/47.5 |

FOREIGN PATENT DOCUMENTS

| | | |
|---|---|---|
| JP | 2005-025899 A | 1/2005 |
| JP | 2006-236509 A | 9/2006 |
| JP | 2007-538350 A | 12/2007 |
| JP | 2008-511096 A | 4/2008 |
| JP | 2010-225281 A | 10/2010 |
| WO | WO 2008/012985 A1 | 1/2008 |
| WO | WO2008/149814 A1 | 12/2008 |
| WO | WO 2008/149814 A1 | 12/2008 |
| WO | WO 2009/008434 A1 | 1/2009 |

OTHER PUBLICATIONS

Fuji et al. "Bit-by-Bit Detection on Super-Resolution Near-Field Structure Disk with Platinum Oxide Layer", Jpn. J. Appl. Phys., vol. 42, pp. L589-L591, Part 2, No. 6A, Jun. 1, 2003.

* cited by examiner

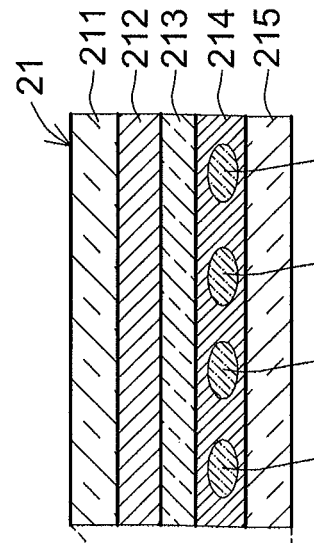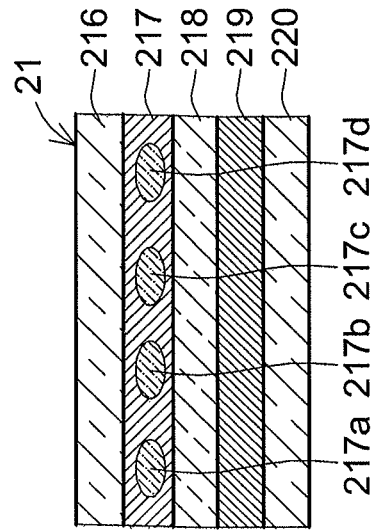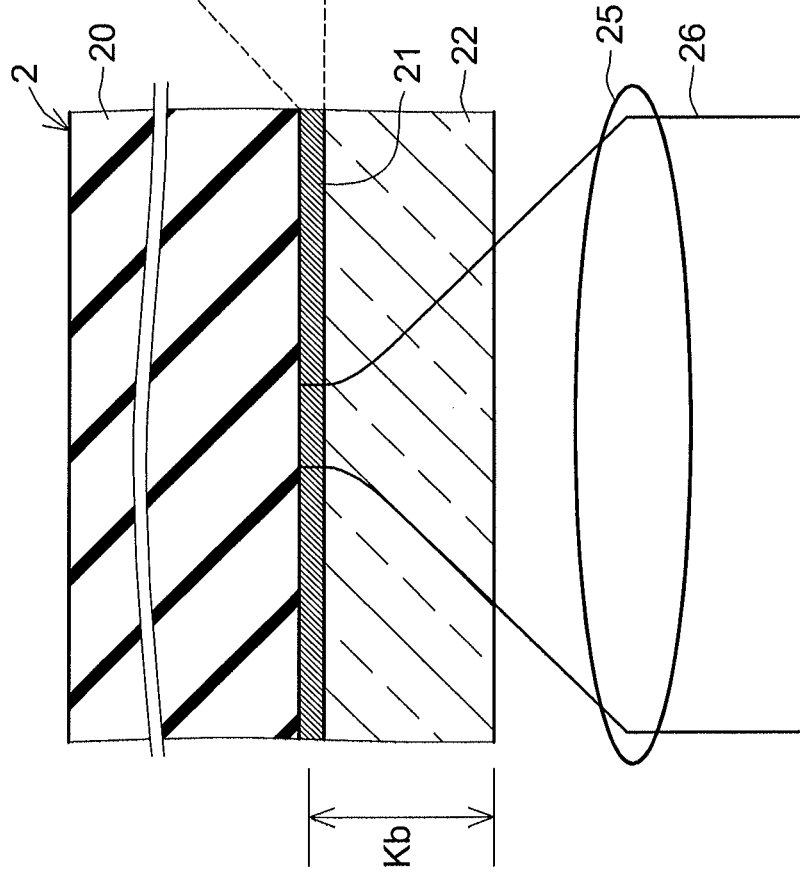

OPTICAL INFORMATION RECORDING MEDIUM AND DRIVE DEVICE

TECHNICAL FIELD

The present invention relates to an optical information recording medium and a drive device, more particularly to an optical information recording medium including a super-resolution functional layer and a drive device.

BACKGROUND ART

An optical disc such as a CD (Compact Disc), DVD (Digital Versatile Disc), or BD (Blu-ray Disc) is an information recording medium used for recording video data, audio data, or other information by irradiation with laser light and for reproducing the recorded information. Optical discs have increased in capacity through successive generations. For example, CDs achieve a 650 MB capacity with an approximately 1.2-mm thick light transmitting disc substrate layer, laser light having a wavelength of approximately 780 nm, and an objective lens having a numerical aperture (NA) of 0.45. DVDs, which were the next generation after CDs, achieve a 4.7 GB capacity with an approximately 0.6-mm thick light transmitting disc substrate layer, laser light having a wavelength of approximately 650 nm, and an NA of 0.6. DVDs have, for example, a structure about 1.2 mm thick, with two disc substrates about 0.6-mm thick bonded together. The standards for BDs, which have even higher recording densities, specify a light transmitting protective layer approximately 0.1 mm thick covering the information recording surface, laser light having a wavelength of approximately 405 nm, and a 0.85 NA; the capacities achieved are 25 GB for a single-layer disc and 50 GB for a dual-layer disc, enabling the recording of high-definition (High-Vision) video over an extended time period. In addition, capacities as large as 100 GB and 128 GB have been realized in multi-layer BDs having three and four layers, respectively, which have been reduced to practice on the basis of single-layer BDs having a single recording layer. The BD standards are disclosed in, for example, Non-Patent Document 1 (Blu-ray Disc White Paper 1.C, Physical Format Specification for BD-ROM, 5th Edition, March 2007).

It is anticipated that general users will be dealing with greatly increased amounts of data in next-generation video with higher definition than High-Vision, and in three-dimensional video, etc., so large capacity optical disc systems capable of storing larger amounts of data, exceeding the capacities of single-layer and multi-layer BDs, are being sought.

The above-described increasing capacities of optical discs have been achieved by greatly reducing the size of the light spot focused on the focal plane of the objective lens, thereby reducing the size of the marks recorded on the tracks in the recording layer, by shortening the wavelength of the laser light and increasing the NA of the objective lens. In reducing the size of the focused spot, however, there is a physical limit defined by the optical performance of the objective lens and the wavelength of the laser light. Specifically, the size limit of a reproducible recorded mark is said to be the diffraction limit $\lambda/(4NA)$ determined by the wavelength $\lambda$ of the laser light and the NA of the objective lens.

In recent years, optical discs (referred to below as super-resolution optical discs) having a super-resolution functional layer with an optical characteristic (such as an optical absorption characteristic or optical transmission characteristic) that varies nonlinearly according to the intensity of the laser light are attracting attention as a way of achieving high-density recording and reproduction beyond the physical limits. When the laser light is focused onto the super-resolution functional layer, the refractive index or another optical characteristic changes in a local area of high light intensity or high temperature within the illuminated spot, and the localized light (such as near-field light or localized plasmon light) generated in the local area is converted to propagating light by mutual interaction with the recorded marks in the recording layer. This makes it possible to use conventional BD optical heads to reproduce information from tiny recorded marks smaller than the $\lambda/(4NA)$ diffraction limit. Accordingly, higher recording densities can be achieved even with a 405-nm laser light wavelength and 0.85 NA objective lens.

A super-resolution optical disc has the advantage that it can assure downward compatibility with single-layer BDs and multi-layer BDs; such compatibility is considered difficult to achieve with other large capacity recording and reproducing technologies such as holographic recording systems, or near-field light recording systems, which require an optical head structure using a solid immersion lens (SIL) having a numerical aperture of unity or greater. The structure of a super-resolution optical disc of this type is disclosed in, for example, Non-Patent Document 2 listed below.

Prior Art References
Patent References
Non-Patent Document 1: Blu-ray Disc White Paper 1.C Physical Format Specification for BD-ROM, 5th Edition, March 2007
Non-Patent Document 2: "Bit-by-Bit Detection on Super-Resolution Near-Field Structure Disc with Platinum Oxide Layer", Jpn. J. Appl. Phys. Vol. 42 (2003) pp. L589-L591

SUMMARY OF THE INVENTION

Problems to be Solved by the Invention

Non-Patent Document 1 defines the thickness of the protective layer (cover layer) as approximately 0.1 mm, thinner than the thickness (approximately 0.6 mm) of the protective layer of a DVD. The reason for this was to cancel out the added coma aberration due to the increased NA of the objective lens and shortened laser wavelength, as compared with a DVD or other lower-standard optical disc. In general, the coma aberration is roughly proportional to the product ($=t \times NA^3$) of the thickness t of the protective layer of the optical disc and the cube of the NA, and is inversely proportional to the wavelength $\lambda$ of the laser light. It is known that such coma aberration occurs mainly due to tilting (disc tilt) of the optical axis of the optical head with respect to the optical disc surface, which is caused by deviation of the angle with which an optical disc is mounted in a production model drive device, warpage of the optical disc, etc. In general, when coma aberration occurs, the diameter of the focused spot on the recording layer increases and the shape of the focused spot is distorted, causing increased flare light (light components that do not contribute to the recording and reproducing of the signal). Large coma aberration is problematic because reproduced signal quality is degraded by the occurrence of inter-symbol interference and inter-track crosstalk.

Coma aberration due to disc tilt also occurs in a super-resolution optical disc, and the disc tilt tolerance (tilt margin) is narrower than for the BDs (including single-layer and multi-layer BDs) of the current standard. Accordingly, if disc tilt occurs in recording or reproduction of information on a super-resolution optical disc by use of a drive device manufactured according to current single-layer and multi-layer BD standards, normal recording and reproducing are apt to be impossible. There is then the problem that downward compatibility with single-layer and multi-layer BDs cannot necessarily be assured.

Although it is technically possible to manufacture drive devices with reduced assembly error and component mounting error to prevent disc tilt, there is then the problem of increased manufacturing cost.

In view of the above, an object of the present invention is to provide an optical information recording medium and drive device that can secure a wide tilt margin, even if the optical information recording medium includes a super-resolution functional layer, while maintaining downward compatibility.

Means for Solving the Problems

An optical information recording medium according to a first aspect of the invention includes at least one recording layer in which recorded marks are formed, a super-resolution functional layer, disposed adjacent the recording layer, with an optical characteristic that changes, at least while irradiated by a laser beam focused by a focusing optical system, in a local area smaller than a diffraction limit determined by the optical performance of the focusing optical system and the wavelength of the laser beam, and a protective layer covering the recording layer and the super-resolution functional layer, for transmitting the laser beam focused by the focusing optical system. The recording layer and the light incidence surface of the protective layer are separated by a thickness having an upper limit of 0.083 mm.

An optical information recording medium according to a second aspect of the invention has a super-resolution multi-layer film including at least one recording layer in which recorded marks are formed, and a protective layer covering the super-resolution multi-layer film, for transmitting a laser beam focused by a focusing optical system. The super-resolution multi-layer film has an optical characteristic that changes, at least while irradiated by the focused laser beam, in a local area smaller than a diffraction limit determined by the optical performance of the focusing optical system and the wavelength of the laser beam. The recording layer and the light incidence surface of the protective layer are separated by a thickness having an upper limit of 0.083 mm.

A drive device according to a third aspect of the invention includes the optical information recording medium of the first or second aspect above, the focusing optical system that focuses the laser beam onto the optical information recording medium, a light receiving element for detecting reflected light from the optical information recording medium, a light guiding optical system for guiding the reflected light from the optical information recording medium to the light receiving element, and a signal processor for carrying out signal processing on an output of the light receiving element to generate a reproduced signal.

Effects of the Invention

The present invention enables a wide tilt margin to be secured while maintaining downward compatibility.

BRIEF DESCRIPTION OF THE DRAWINGS

FIGS. 9(A) to 9(C) are drawings schematically showing the structure of a recordable super-resolution optical disc in a second embodiment, which is a variation of the first embodiment.

MODE FOR CARRYING OUT THE INVENTION

Figure 1:
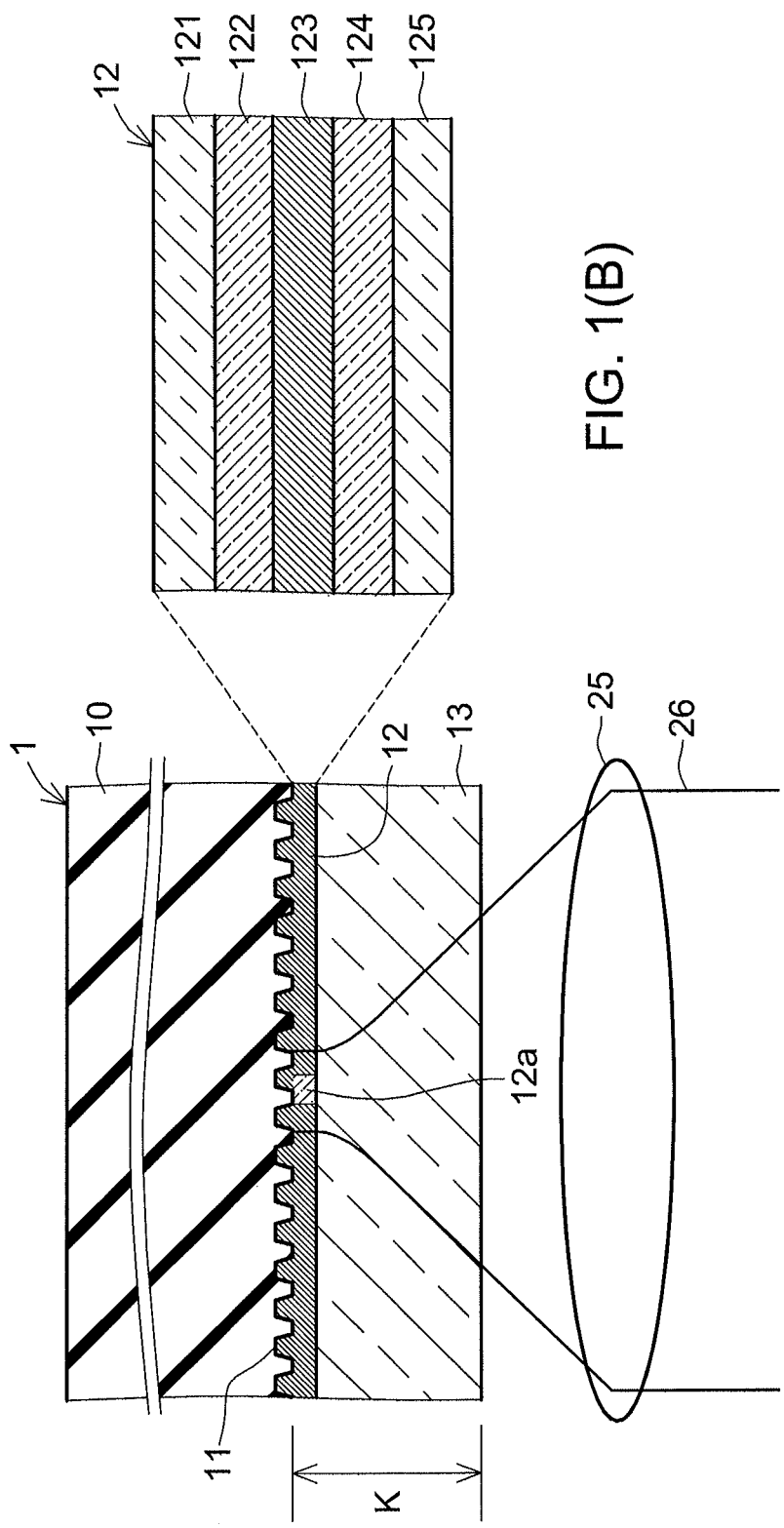
FIGS. 1(A) and 1(B) are drawings schematically showing the structure of a super-resolution optical disc exemplifying the optical information recording medium in a first embodiment of the invention.

Embodiments of the invention will now be described with reference to the drawings.

First Embodiment

FIGS. 1(A) and 1(B) are drawings schematically showing a super-resolution optical disc 1 exemplifying a reproduce-only (read-only) optical information recording medium in the first embodiment of the invention. As shown in FIG. 1(A), the super-resolution optical disc 1 includes a substrate 10 of polycarbonate, glass, or the like, a recording layer 11 formed in the substrate 10, a super-resolution functional layer 12 formed adjacent the recording layer 11, and a protective layer 13 covering the recording layer 11 and super-resolution functional layer 12. The protective layer 13 consists of a material that transmits a laser beam 26 focused by the focusing optical system 25 of an optical pickup (not shown). The protective layer 13 can be formed by, for example, the bonding of a thin light-transmitting resin sheet with a light-transmitting adhesive layer, or the spin coating of an ultraviolet curable resin which is then cured by irradiation with ultraviolet light.

The recording layer 11, with recorded marks, is formed in the light incidence surface of the substrate 10. The recording layer 11 may have, for example, a fine relief pattern consisting of grooves or rows of pits (recorded marks) formed by an embossing process, and a reflective film (not shown) of aluminum or another material formed over the relief pattern. The size of each pit is smaller than the diffraction limit $\lambda/(4NA)$ defined by the NA of the focusing optical system 25 and the wavelength $\lambda$ of the laser beam 26.

The super-resolution functional layer 12 is interposed between the recording layer 11 and protective layer 13 and has a nonlinear light absorption characteristic or nonlinear light transmission characteristic such that the refractive index or another optical characteristic varies under illumination by the focused spot of the laser beam 26. A local region with an altered optical characteristic, that is, an optical aperture 12a, is formed in the super-resolution functional layer 12 when irradiated by the focused spot of the laser beam 26. Localized light (such as near-field light or localized plasmon light) generated in the optical aperture 12a is converted to propagating light by mutual interaction with the recorded sub-diffraction-limit marks. It is thereby possible to detect recorded marks smaller than the diffraction limit $\lambda/(4NA)$ with high resolution and reproduce information from the recorded marks.

FIG. 1(B) is a drawing showing an example of the structure of the super-resolution functional layer 12. As shown in FIG. 1(B), the super-resolution functional layer 12 includes a dielectric layer 121, an interference layer 122, a super-resolution mask layer 123, and another interference layer 124 and dielectric layer 125. The super-resolution mask layer 123 may be formed from a material in the Ge—Sb—Te family, Ag—In—Sb—Te family, Sb—Te family, or In—Sb family. Alternatively, the super-resolution mask layer 123 may be formed from ZnO or another metal oxide material.

The dielectric layers 121, 125 mainly function to prevent thermal diffusion of the constituent materials of the super-resolution mask layer 123 sandwiched between them. The dielectric layers 121, 125 may be formed from ZnS—$SiO_2$ or AlN, for example. One interference layer 122 is interposed between dielectric layer 121 and the super-resolution mask layer 123; the other interference layer 124 is interposed between dielectric layer 125 and the super-resolution mask layer 123. The interference layers 122, 124 function both to cause multiple interference of light and to prevent thermal diffusion. The interference layers 122, 124 may be formed from AlN, GeN, or $ZrO_2$, for example. Provision of the dielectric layers 121, 125 and interference layers 122, 124 can improve the reproduction durability of the super-resolution mask layer 123. The structure of the super-resolution functional layer 12 shown in FIG. 1(B) is exemplary; there are no particular restrictions on the structure, number of films, or constituent materials of the super-resolution functional layer 12.

In this embodiment, the upper limit of the thickness between the light incidence surface of the protective layer 13 and the recording layer 11, that is, the thickness K of the cover layer covering the recording layer 11, is 0.083 mm, or more preferably 0.080 mm, which is 0.020 mm thinner than the thickness (=0.1 mm) of the cover layer in a BD. As disclosed in Non-Patent Document 1, in the BD specifications, the thickness tolerance of the cover layer is ±0.003 mm, so the value 0.083 mm is obtained by adding this tolerance (+0.003 mm) to the value 0.080 mm. The thickness of the super-resolution functional layer 12 is from several nanometers to several hundred nanometers, and is accordingly almost negligible in comparison with the total thickness K of the cover layer. The thickness K of the cover layer is therefore substantially the same as the thickness of the protective layer 13.

As described later, setting the upper limit value of the thickness K of the cover layer at 0.083 mm, more preferably 0.080 mm, enables a wider tilt margin to be secured, even with a super-resolution optical disc 1 including a super-resolution functional layer 12, while maintaining downward compatibility with current optical discs such as BDs, and can restrict the degradation of recording and reproducing characteristics due to disc tilt. The super-resolution optical disc 1 in this embodiment is downwardly compatible with BDs, including not only single-layer BDs with a single recording layer but also multi-layer BDs with two or more recording layers. This is also true in the second and third embodiments described later. These BDs use a common set of optical parameters (e.g., the wavelength of the laser light and the numerical aperture of the objective lens). The description below uses a single-layer BD as an example of a lower standard, but a similar description is applicable to a multi-layer BD.

Figure 2:
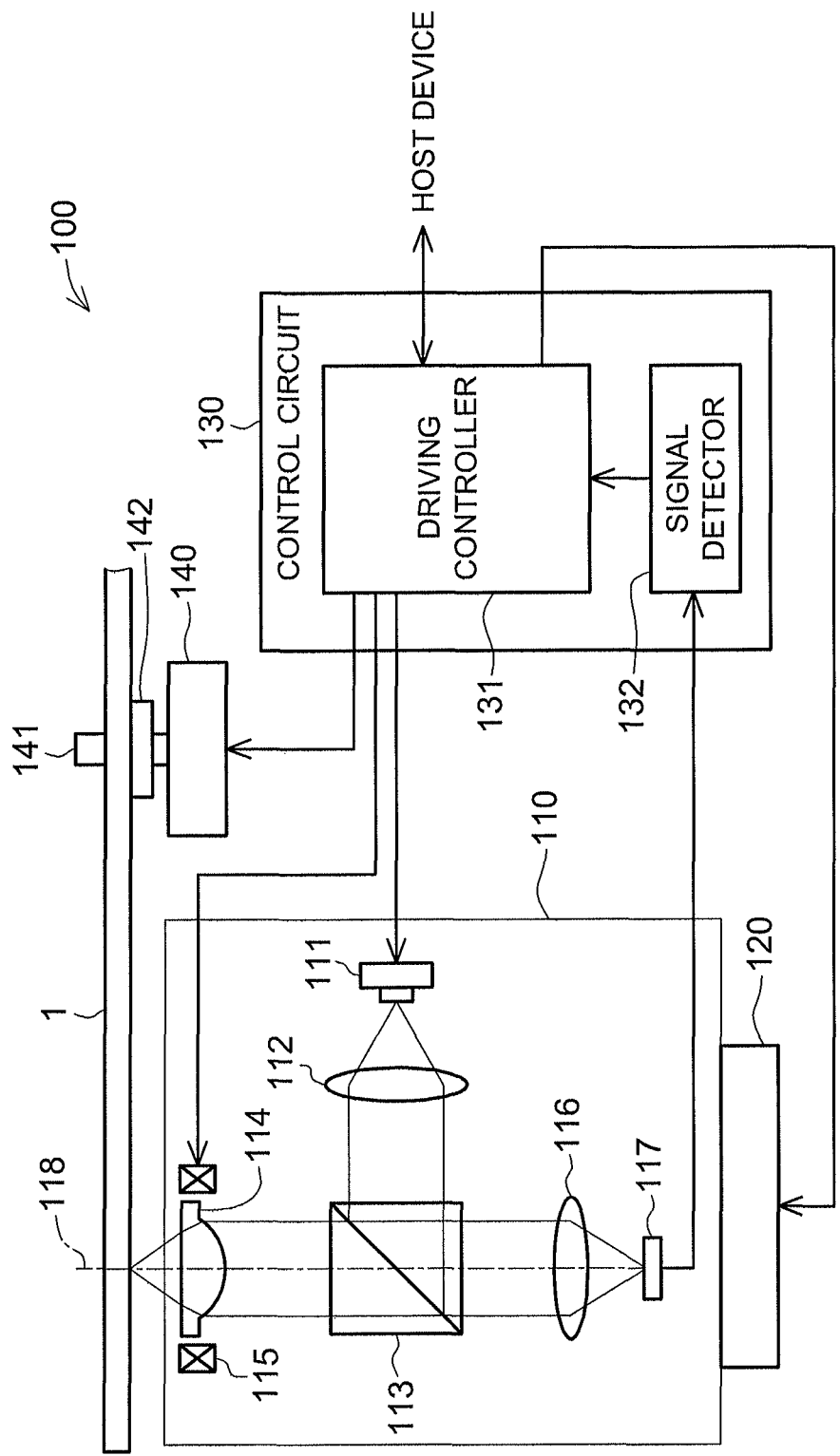
FIG. 2 is a drawing schematically showing an exemplary structure of a BD optical disc device.

The recording and reproducing of information with the super-resolution optical disc 1 described above can be carried out by use of an optical disc device (drive device). FIG. 2 is a drawing schematically showing an example of the structure of an optical disc device 100. The structure of the optical disc device 100 is not limited to the structure in FIG. 2.

As shown in FIG. 2, the optical disc device 100 includes an optical pickup (optical head) 110, a seek mechanism 120 for shifting and thereby positioning the optical pickup 110 in the radial direction of the super-resolution optical disc 1, and a control circuit 130 for controlling the operation of the optical pickup 110 and seek mechanism 120. The optical pickup 110 includes a laser light source 111, a collimator lens 112, a beam splitter 113, an objective lens 114, a lens actuator 115, a focusing lens 116, and a light receiving element 117.

The structure of the optical pickup 110 shown in FIG. 2 is exemplary and not limiting. For example, the optical pickup 110 has a blue-violet laser light source 111 (approximate wavelength: 405 nm), but this is not a limitation; the optical pickup may include multiple laser light sources emitting laser light with wavelengths suited for other types of optical discs such as CDs (Compact Discs) and DVDs (Digital Versatile Discs) (wavelengths different from the wavelength for BDs), and corresponding optical systems. The optical pickup 110 may also include a spherical aberration correction mechanism as a means for correcting spherical aberration occurring due to error in the cover layer thickness. The spherical aberration correction mechanism may include, for example, a collimator lens (not shown) disposed between the beam splitter 113 and objective lens 114, a lens driving unit (not shown) for shifting the collimator lens in the optical axis direction, and a control circuit (not shown) for controlling the operation of the lens driving unit. Alternatively, the optical pickup 110 may have a spherical aberration correction mechanism including a liquid crystal optical modulator (not shown) disposed between the beam splitter 113 and objective lens 114, a liquid crystal driver (not shown) for forming an electrical field distribution within the liquid crystal optical modulator, and a control circuit (not shown) for controlling the operation of the liquid crystal driver. A liquid crystal optical modulator can correct spherical aberration by spatially modulating the optical path length of the laser beam passing through the liquid crystal optical modulator.

The control circuit 130 performs reproduction control and recording control for the super-resolution optical disc 1. The control circuit 130 includes a driving controller 131 and a signal detector (signal processor) 132. The driving controller 131 has the function of controlling the operation of the laser light source 111, lens actuator 115, seek mechanism 120, and spindle motor 140 according to commands from a computer or other host device (not shown). Under control by the driving controller 131, the spindle motor 140 rotates the super-resolution optical disc 1, which is removably mounted on the turntable (media mounting unit) 142.

The laser light source 111 emits a laser beam with a center wavelength of 405 nm, capable of recording and reproducing on a BD. The light emitted from the laser light source 111 passes through the collimator lens 112 and enters the beam splitter 113. The laser beam reflected by the beam splitter 113 passes through a quarter waveplate (not shown) and enters the objective lens 114, which has an NA of 0.85. The objective lens 114 focuses the laser beam incident from the beam splitter 113 onto the super-resolution optical disc 1. As schematically shown in FIG. 1, when the laser beam is focused onto the super-resolution functional layer 12 of the super-resolution optical disc 1, an optical micro-aperture 12a is formed, and localized light generated in the aperture 12a interacts with the recording layer 11.

The reproducing light (returning light) reflected by the recording layer 11 of the super-resolution optical disc 1 passes through the objective lens 114, the quarter waveplate (not shown), and the beam splitter 113, and is focused onto the light detection surface of the light receiving element 117 by the focusing lens 116. The light receiving element 117 detects the reproducing light and supplies the detected signal to the signal detector 132. The signal detector 132 generates a tracking error signal (for example, a tracking error signal generated by the push-pull method or phase difference method), a focus error signal, and a reproduced RF signal, and sends these signals to the driving controller 131.

The driving controller 131 has the function of supplying driving signals to the lens actuator 115 based on the tracking error signal and focus error signal, thereby performing tracking control to make the focused spot track the recorded tracks on the super-resolution optical disc 1 and focusing control to focus the laser beam in the vicinity of the recording layer 11. The lens actuator 115 shifts the objective lens 114 in the direction of the optical axis 118 (focusing direction) and the tracking direction responsive to the driving signals supplied from the driving controller 131. The driving controller 131 also has the function of performing spindle control to match the actual rate of rotation of the spindle motor 140 to a target rate of rotation.

Figure 3:
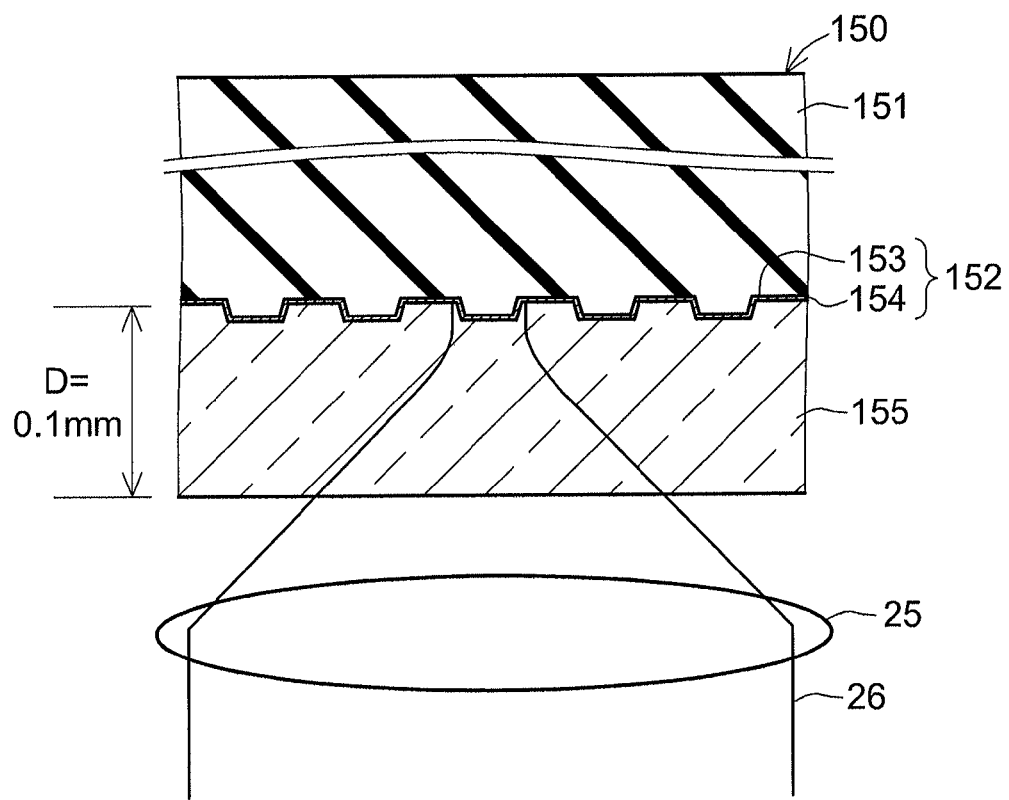
FIG. 3 is a cross-sectional view schematically showing an exemplary structure of a single-layer optical disc having the same single recording layer as a BD.

The optical disc device 100 is capable of recording and reproducing information not only on the super-resolution optical disc 1 but also on a BD (Blu-ray disc). FIG. 3 is a cross-sectional view schematically showing an example of the structure of a single-layer optical disc (BD) 150 having a single recording layer. The optical disc device 100 is also capable of recording and reproducing information on multi-layer optical discs with multiple recording layers.

As shown in FIG. 3, the optical disc (BD) 150 includes a substrate 151 approximately 1.1 mm thick, and an information recording surface 153 having a relief pattern of embossed pits formed on the substrate 151. The thickness of the substrate 151 is set at 1.1 mm in order for the total thickness of the BD to satisfy mechanical strength requirements. The laser beam 26 is focused onto the information recording surface 153 by the focusing optical system 25. A multi-layer film 154 consisting of a plurality of metal reflective films giving a desired reflectance with respect to the laser beam 26 is formed on the information recording surface 153. A light transmitting protective layer 155 (cover layer) is formed, covering the recording layer 152. The protective layer 155 is formed from, for example, polycarbonate, another such resin material, an ultraviolet curable resin, or a glass material.

For a BD, in order to increase the amount of data recordable on a single optical disc to an amount five times more than the amount recordable on a DVD, an objective lens with an NA of 0.85 and laser light with a wavelength of 405 nm are employed. Accordingly, the optical pickup 110 of the optical disc device 100 also includes an objective lens 114 with an NA of 0.85 and a laser light source 111 emitting a laser beam with a center wavelength of 405 nm. The thickness of the protective layer 155 is 0.1 mm. The thickness of the protective layer 155 is set at 0.1 mm to cancel the additional coma aberration caused by the increased NA of the objective lens and shortened wavelength of the laser light. When coma aberration occurs due to disc tilt, the diameter of the focused spot on the recording layer 152 is increased and the shape of the focused spot is distorted. Therefore, when large coma aberration occurs, inter-symbol interference and crosstalk (signal crosstalk) occur, degrading the reproduced signal quality. To restrict such degradation of the reproduced signal quality, the tilt of the optical disc surface in the radial direction with respect to the optical axis 118 of the optical pickup 110 (radial tilt) and the tilt of the optical disc surface in the tangential direction with respect to the optical axis 118 (tangential tilt) must be restricted to respectively fixed angular ranges.

When coma aberration occurs in a super-resolution optical disc 1 due to disc tilt, the maximum peak intensity of the focused spot formed in the super-resolution functional layer 12 is reduced. Significant reduction in the maximum peak intensity of the focused spot prevents the formation of a good micro-aperture 12a in the super-resolution functional layer 12, thereby degrading the reproduction resolution. The intensity of the localized light generated at the micro-aperture 12a formed in the super-resolution functional layer 12 also depends on the intensity of the focused spot that irradiates the super-resolution functional layer 12, so if the maximum peak intensity of the focused spot is significantly reduced, the reproduction resolution is reduced.

Figure 4:
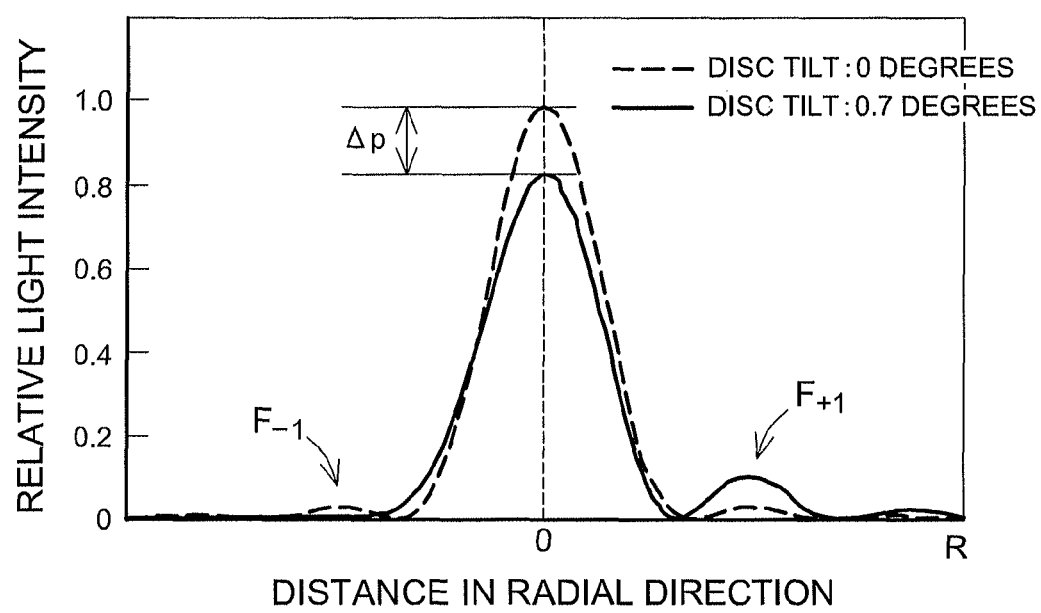
FIG. 4 is a graph showing simulation results representing the light intensity distribution of the focused spot in the radial direction.

FIG. 4 is a graph of simulation results representing the light intensity profile of the focused spot in the radial direction. In the graph in FIG. 4, the vertical axis indicates relative light intensity and the horizontal axis indicates the distances in the radial direction from the position (R=0) corresponding to the maximum peak intensity. As shown in FIG. 4, when the disc tilt (radial tilt) is 0 degrees, that is, when no disc tilt occurs, the maximum peak intensity is high. In contrast, when the disc tilt (radial tilt) is 0.7 degrees, coma aberration occurs, and the maximum peak intensity decreases by 18 percent (=Δp) of the maximum peak intensity at 0-degree disc tilt. One of the first-order flare components $F_{-1}$ and $F_{+1}$, specifically, first-order flare component $F_{+1}$, is thereby increased. In addition, in comparison with the case in which no disc tilt occurs, the diameter of the focused spot is also larger when the disc tilt is 0.7 degrees.

When a signal is reproduced from a BD (Blu-ray disc) by use of a focused spot in which coma aberration occurs, the reproduction resolution is reduced by the increased diameter of the focused spot, and the reproduction resolution is degraded by inter-symbol interference and crosstalk (signal crosstalk) from mutually adjacent tracks due to the increase in the first-order flare component $F_{+1}$. The result is an increased error rate. When a signal is reproduced from a super-resolution optical disc by use of a focused spot in which coma aberration occurs, in addition to inter-symbol interference and crosstalk, degradation of the micro-aperture 12a also reduces the reproduction resolution. Since the micro-aperture 12a is formed in a super-resolution mask layer 123 having a nonlinear optical characteristic with respect to the intensity of the focused spot, if the intensity of the focused spot is reduced by the occurrence of coma aberration, a good micro-aperture 12a is not formed, causing a reduction in the reproduction resolution for small recorded marks under the diffraction limit.

Figure 5:
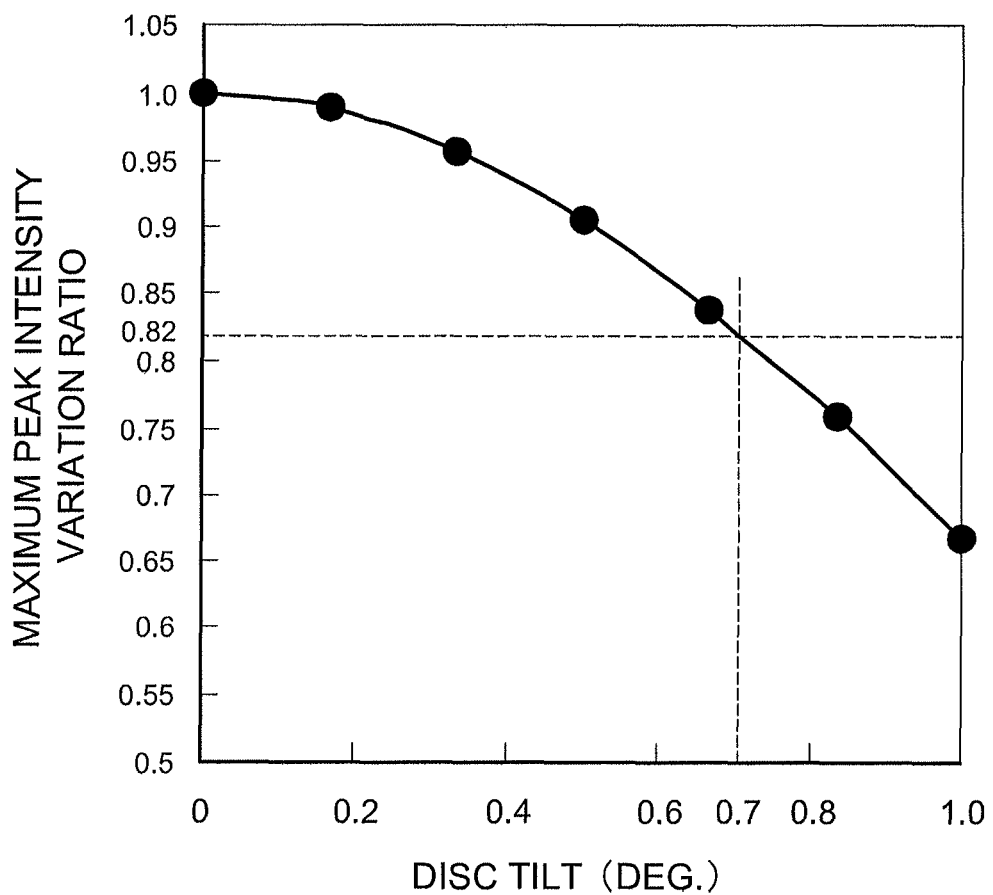
FIG. 5 is a graph showing simulation results representing maximum peak intensity variation ratios of the focused spot in relation to disc tilt.

FIG. 5 is a graph of simulation results representing the maximum peak intensity variation ratio of the focused spot in relation to disc tilt (radial tilt). These simulation results also show that the maximum peak intensity decreases with increased disc tilt and increased coma aberration. The reduction in the maximum peak intensity leads to degradation of the micro-aperture in the super-resolution functional layer 12. The reduction in reproduction resolution due to degradation of the micro-aperture is expected to be approximately 1.2 times the reduction of the reproduction resolution due to coma aberration in a conventional BD.

Figure 6:
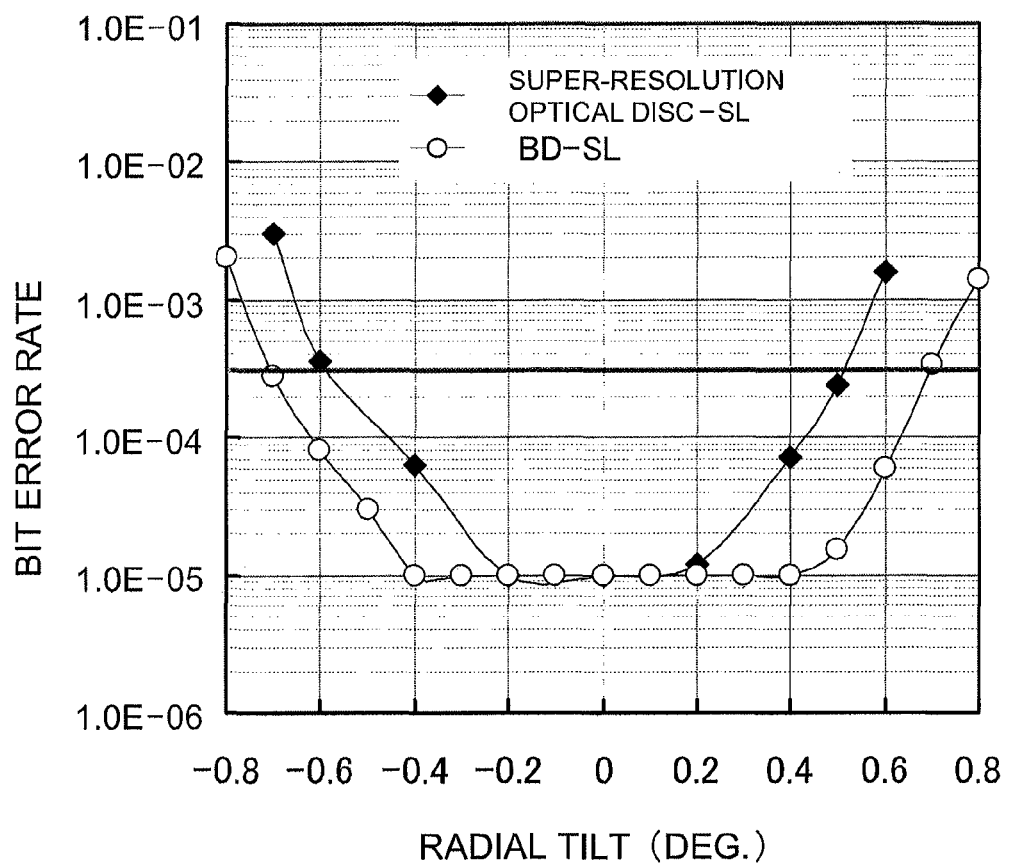
FIG. 6 is a graph showing results of measurements of bit error rate in relation to radial tilt.
Figure 7:
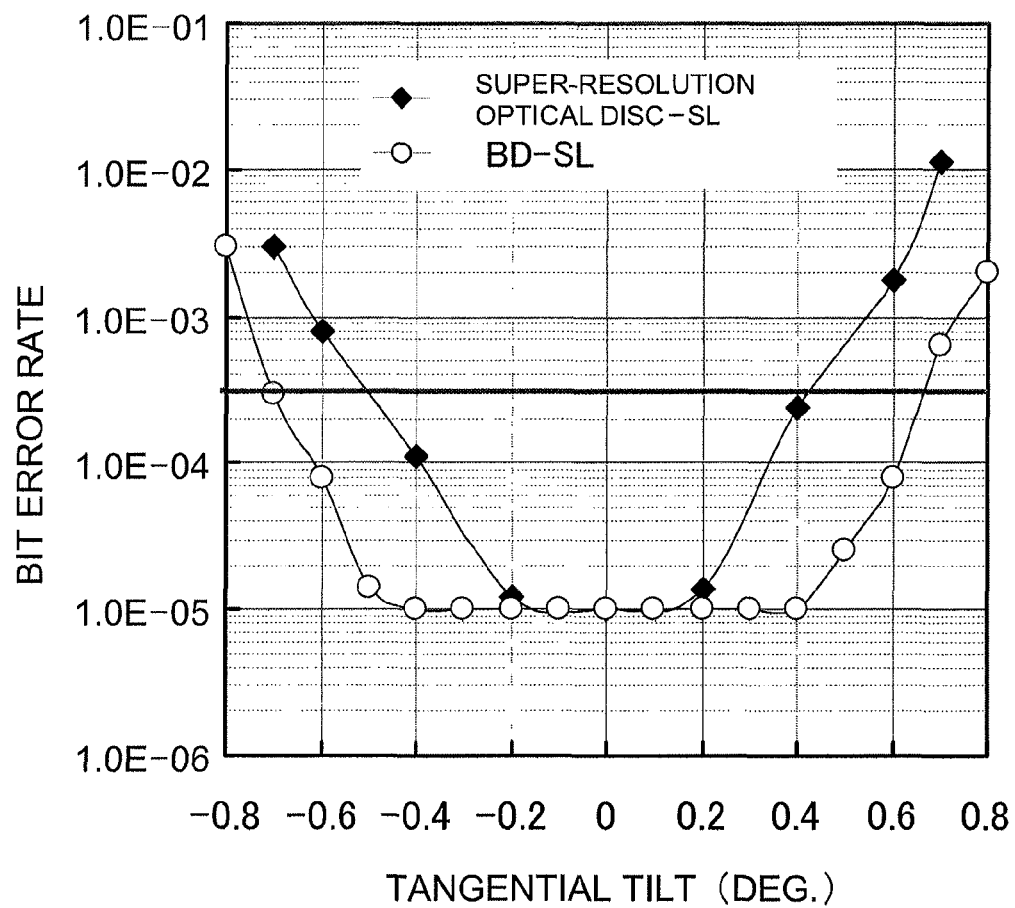
FIG. 7 is a graph showing results of measurements of bit error rate in relation to tilt.

FIG. 6 is a graph showing the results of measurements of bit error rate in relation to radial tilt for a super-resolution optical disc having a 0.1-mm thick cover layer and a single-layer optical disc (BD-SL) 150, and FIG. 7 is a graph showing the results of measurements of the bit error rate in relation to tangential tilt. In the graph in FIG. 6, the horizontal axis indicates radial tilt in the range from −0.8 degrees to 0.8 degrees on a linear scale, and the vertical axis indicates the bit error rate in the range from $1.0\times10^{-6}$ (1.0E−06) to $1.0\times10^{-1}$ (1.0E−01) on a logarithmic scale. In the graph in FIG. 7, the horizontal axis indicates tangential tilt within the range from −0.8 degrees to 0.8 degrees on a linear scale, and the vertical axis indicates the bit error rate in the range from $1.0\times10^{-6}$ (1.0E−06) to $1.0\times10^{-1}$ (1.0E−01) on a logarithmic scale. The exemplary super-resolution optical disc 150 used here has a minimum pit length of 75 nm. With respect to a reference bit error rate (bER) of $3\times10^{-4}$, as shown in FIGS. 6 and 7, for the BD-SL, the assured tolerance range is from approximately −0.7 degrees to approximately +0.7 degrees (a tilt margin of ±0.7 degrees) for both tangential tilt and radial tilt. In contrast, for the super-resolution optical disc, as shown in FIG. 6, the assured tolerance range is only from approximately −0.6 degrees to approximately +0.52 degrees (a tilt margin of ±0.56 degrees) for radial tilt, and only from approximately −0.5 degrees to approximately +0.4 degrees for tangential tile. Therefore, in order to form a good micro-aperture in a super-resolution optical disc, the maximum peak intensity parameter of the focused spot must be considered.

Based on the above results of measurements of disc tilt characteristics, a preferred numerical range can be derived for the thickness K of the cover layer covering the recording layer 11 of the super-resolution optical disc 1 (FIG. 1) in the first embodiment. The method will now be described.

It is known that coma aberration is proportional to a third-order coma aberration coefficient $W_{31}$ given by the following general equation (1) and inversely proportional to the wavelength λ of the laser light.

[Mathematical formula 1]

$$W_{31} = -\frac{d}{2} \times \frac{n^2(n^2-1)\sin\theta\cos\theta}{(n^2-\sin^2\theta)^{5/2}} \times (NA)^3 \tag{1}$$

In the above equation (1), θ indicates the tilt angle of the optical disc with respect to the optical axis of the optical pickup, that is, the tilt quantity, n is the refractive index of the cover layer covering the recording layer of the optical disc, and NA is the numerical aperture of the objective lens.

The refractive index is approximately 1.5 and θ has a small value of 1° or less, so the relationship $n^2>1>\sin\theta$ holds. Therefore, the equation (1) for the coma aberration coefficient $W_{31}$ can be approximated as equation (2) below.

[Mathematical formula 2]

$$W_{31} \cong -\frac{d}{2} \times \frac{(n^2-1)\theta}{n^3} \times (NA)^3 \tag{2}$$

It will now be assumed that the limit value of the tilt margin of the super-resolution optical disc is $\theta_1$ and the thickness of the cover layer covering the recording layer of the super-resolution optical disc is D, and the coma aberration coefficient for the super-resolution optical disc when the tilt θ equals $\theta_1$ will be represented by $W_{31}(SR)$. It will be assumed that the limit value of the tilt margin of a conventional optical disc without a super-resolution functional layer is $\theta_2$ ($\theta_2>\theta_1$) and the thickness of the cover layer covering the recording layer of the conventional optical disc is D, and the coma aberration coefficient for the conventional optical disc when the tilt θ equals $\theta_2$ will be represented by $W_{31}(NoSR)$. The coma aberration coefficients $W_{31}(SR)$ and $W_{31}(NoSR)$ are then given by the following equations (3A) and (3B).

[Mathematical formula 3]

$$W_{31}(SR) \cong -\frac{D}{2} \times \frac{(n^2-1)\theta_1}{n^3} \times (NA)^3 \tag{3A}$$

$$W_{31}(NoSR) \cong -\frac{D}{2} \times \frac{(n^2-1)\theta_2}{n^3} \times (NA)^3 \tag{3B}$$

Under the condition that the wavelength of the laser light, the numerical aperture of the objective lens, and the refractive index of the cover layer are held constant, one condition under which the coma aberration coefficient for the super-resolution optical disc does not vary when the limit value $\theta_1$ of the tilt margin of the super-resolution optical disc is increased to the same value as the limit value $\theta_2$ of the tilt margin of the conventional optical disc, in other words, one condition under which the coma aberration coefficient $W_{31}(SR)$ for the super-resolution optical disc does not vary when $\theta_1$ is increased to $\theta_2$ under the condition that the laser light wavelength, the numerical aperture of the objective lens, and the refractive index of the cover layer are held constant, is that the thickness of the cover layer of the super-resolution optical disc is altered by a factor of $\theta_1/\theta_2$.

[Mathematical formula 4]

$$\theta_1 \to \theta_2, D \to D \times \frac{\theta_1}{\theta_2} \tag{3C}$$

Accordingly, by setting the center value Kc of the thickness K of the cover layer covering the recording layer 11 of the super-resolution optical disc 1 in FIG. 1 as in equation (4) below, the tilt margin of the super-resolution optical disc 1 can be widened without causing more coma aberration to occur in the super-resolution optical disc 1. The reduction in the maximum peak intensity of the focused spot formed in the super-resolution functional layer 12 can thereby be restricted.

[Mathematical formula 5]

$$Kc = D - \alpha = D \times \frac{\theta_1}{\theta_2} \tag{4}$$

A rearrangement of the terms in equation (4) above yields the following equation (5).

[Mathematical formula 6]

$$\alpha = D\left(1 - \frac{\theta_1}{\theta_2}\right) \tag{5}$$

If the tolerance of the thickness of the cover layer of the super-resolution optical disc 1 is ±δ, from equation (4), the tolerance value Ke of the thickness K is given by equation (6) below.

[Mathematical formula 7]

$$Ke = D \times \frac{\theta_1}{\theta_2} \pm \delta \quad (6)$$

If the thickness K of the cover layer of the super-resolution optical disc 1 is optimized to a range less than the upper limit value ($=D\times\theta_1/\theta_2+\delta$) of the tolerance value Ke given by the above equation (6), the reduction in the maximum peak intensity of the focused spot formed in the super-resolution functional layer 12 and the reduction in the super-resolution effect can be restricted, making it possible to assure a wide tilt margin at least substantially equal to that of a BD.

Of the tangential tilt and radial tilt of the super-resolution optical disc 1, the inter-symbol interference caused by tangential tilt is comparatively easy to eliminate by signal processing, but it is difficult to eliminate the crosstalk between adjacent tracks due to radial tilt by signal processing. The radial tilt margin characteristic tends therefore to be tight. Taking this point into consideration, a preferred numerical range for the thickness K of the cover layer of the super-resolution optical disc 1 such that the radial tilt characteristic of the super-resolution optical disc 1 becomes equivalent to the radial tilt characteristic of a BD will be determined.

The measurement results in FIG. 6 showed that the radial tilt margin of a BD-SL is ±0.7 degrees and the radial tilt margin of the super-resolution optical disc 1 is ±0.56 degrees. The difference between these margins is caused by the degradation of the micro-aperture 12a formed in the super-resolution functional layer 12 of the super-resolution optical disc 1 and the reduction in the maximum peak intensity of the focused spot as described above. The thickness of the cover layer is distributed over a certain range of variation due to production tolerances. According to the BD specifications disclosed in Non-Patent Document 1, the thickness tolerance of the cover layer is ±0.003 mm. Accordingly, if D=0.1 mm, $\theta_1$=0.56 degrees, $\theta_2$=0.7 degrees, and $\delta$=0.003 mm, then the upper limit value Kmax of the thickness K of the cover layer of the super-resolution optical disc 1 can be determined as follows from the above equation (6).

Kmax=0.080 mm+0.003 mm

It also follows from the above that the center value of the thickness K of the cover layer for the super-resolution optical disc 1 is preferably set at 0.080 mm. The value $\alpha$=0.020 mm of the difference between the thickness (=0.1 mm) of the cover layer of a BD and the thickness K of the cover layer of the super-resolution optical disc 1 is much larger than the thickness tolerance (=0.003 mm) of the cover layer required in the BD specifications, and can hardly be considered to lie within the practical range of production error.

In order to reduce coma aberration, the thickness from the light incidence surface of the protective layer 13 to the recording layer 11 is preferably thinner than the lower limit value ($=D\times\theta_1/\theta_2-\delta$) of the thickness K when a tolerance of ±$\delta$ is allowed, but a sufficient thickness K from the protective layer 13 to the recording layer 11 should be secured with regard to the fact that foreign matter, scratches, etc. on the surface of the protective layer 13 can easily degrade the reproduced signal.

Figures 8A, 8B:
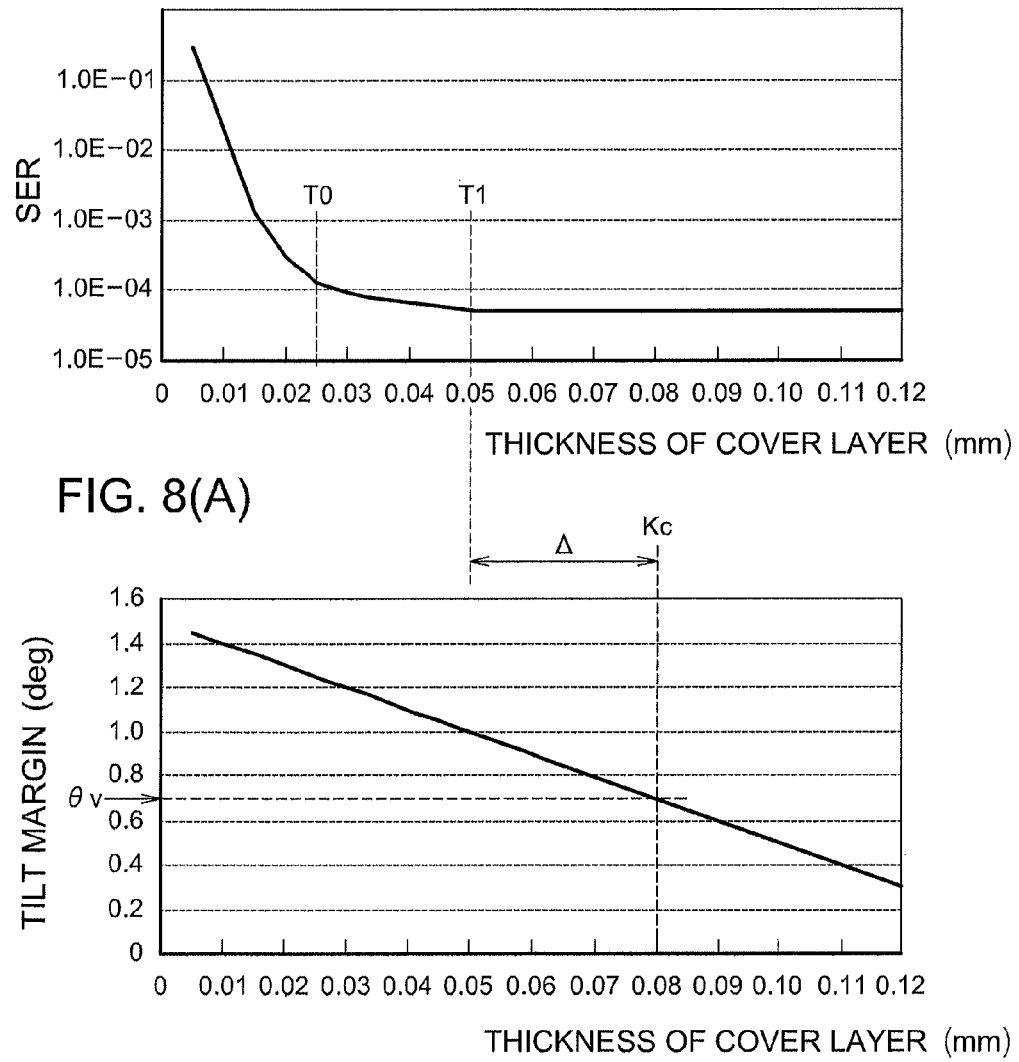
FIG. 8(A) is a graph schematically illustrating the relationship between cover layer thickness and symbol error rate.
FIG. 8(B) is a graph schematically illustrating the relationship between cover layer thickness and tilt margin.

To reduce the effect of foreign matter, scratches, etc. on the surface of the cover layer of a BD, the recording system for recording data in the BD performs an error correction coding process on the data and an interleaving process that scatters (interleaves) the data, including the added error correction code. The interleaving process scatters the recorded codewords of the data at constant intervals (e.g., intervals of substantially 280 μm), so that error correction is possible when a burst error occurs. Too thin a cover layer, however, increases the error rate after error correction in the reproduction of data. This is also true of a super-resolution optical disc that is downwardly compatible with a BD. FIG. 8(A) is a graph schematically illustrating the relationship between the thickness of the cover layer of the super-resolution optical disc and the symbol error rate (SER). FIG. 8(B) is a graph schematically illustrating the relationship between the thickness of the cover layer of the super-resolution optical disc and the tilt margin. In the graph in FIG. 8(A), the vertical axis indicates symbol error rates within the range from $1.0\times10^{-5}$ (1.0E−05) to $1.0\times10^{-1}$ (1.0E−01) on a logarithmic scale, and the horizontal axis indicates the thickness (unit: mm) of the cover layer on a linear scale. In the graph in FIG. 8(B), the vertical axis indicates the tilt margin (unit: degree) on a linear scale, and the horizontal axis indicates the thickness (unit: mm) of the cover layer on a linear scale.

As shown in FIG. 8(A), there is a tendency for degradation of reproduction performance to increase due to the effects of foreign matter, scratches, etc. on the surface of the cover layer when the thickness of the cover layer is in the range from 0.020 mm to 0.030 mm, in the vicinity of 0.025 mm (=T0). This is related to the area of the light spot on the surface of the cover layer and the size of the area occupied by the foreign matter, scratches, etc. A super-resolution optical disc provides a higher data recording density than a BD, so the reproduced signal is more susceptible to the effects of foreign matter and scratches. Accordingly, the thickness of the cover layer should not be too thin. For example, if the data recording density of a super-resolution optical disc is raised by a factor of four over that of a BD, the quantity of data affected by foreign matter, scratches, etc. of the same size is expected to be proportional to the square root of the density ratio. Accordingly, the effect of foreign matter, scratches, etc. can be restricted by setting the thickness of the cover layer so as to increase the area of the light spot by a factor of two ($=4^{1/2}$), for example. Making the cover layer thinner than that of a BD also produces extra tilt margin, working to the advantage of the total system margin. For the super-resolution optical disc 1 in this embodiment, the lower limit of the thickness K of the cover layer is preferably set so as to satisfy the total system performance margin, including the effects of foreign matter, scratches, etc. on the surface of the protective layer 13.

In view of the above, the thickness K of the cover layer of the super-resolution optical disc 1 in this embodiment is preferably 0.05 mm or more. The value of 0.05 mm (=T1) is twice the value of 0.025 mm (=T0) shown in FIG. 8(A). As mentioned above, the optical pickup may be equipped with a spherical aberration correction mechanism. The thickness K of the cover layer of the super-resolution optical disc 1 should also be set at a value of approximately 0.05 mm or more from the viewpoint of making the super-resolution optical disc 1 in this embodiment downwardly compatible with BDs while curbing excessive increase in the manufacturing cost of the spherical aberration correction mechanism.

On the other hand, the thickness of the cover layer of the super-resolution optical disc and the tilt margin are in a substantially inverse proportional relationship, as shown in FIG. 8(B). When the limit value $\theta v$ of the tilt margin of the super-resolution optical disc 1 in this embodiment matches the limit value (approximately 0.7 degrees) of the tilt margin of the above-mentioned BD-SL, the thickness K of the cover layer of the super-resolution optical disc 1 substantially matches the center value Kc (=0.08 mm) of the thickness K in FIG. 8(B). When the tolerance ±$\delta$ is not taken into consideration, the preferred range Δ of the thickness K of the cover layer of the super-resolution optical disc 1 is therefore 0.05 mm (=T1) to 0.08 mm (=Kc).

Setting the upper limit of the thickness K of the cover layer of the super-resolution optical disc 1 at 0.083 mm, or more preferably 0.080 mm, as described above, enables a wide tilt margin to be secured even when a BD optical disc device 100 (FIG. 2) is used to record and reproduce information on a super-resolution optical disc 1. More specifically, the reduction in the maximum peak intensity of the focused spot formed in the super-resolution functional layer 12 and the reduction in the super-resolution effect can be restricted, thereby restricting the degradation of the reproduction resolution. A super-resolution optical disc 1 capable of assuring downward compatibility with BDs can therefore be provided without increasing the production cost of the optical disc device 100.

Second Embodiment

Next a second embodiment, which is a first variation of the first embodiment, will be described. The super-resolution optical disc 1 (FIG. 1) in the first embodiment has a reproduce-only type of structure, but this is not a limitation. FIGS. 9(A) and 9(B) are drawings schematically showing the structure of a recordable super-resolution optical disc 2 in the second embodiment.

As shown in FIG. 9(A), the recordable super-resolution optical disc 2 includes a substrate 20 of polycarbonate, glass, or the like, a super-resolution multi-layer film 21 formed on the substrate 20, and a protective layer 22 covering the super-resolution multi-layer film 21. The protective layer 22 consists of a material that transmits a laser beam 26 focused by the focusing optical system 25 of an optical pickup (e.g., the optical pickup 110 in FIG. 2). The protective layer 22 can be formed by the bonding of a thin light-transmitting resin sheet with a light-transmitting adhesive layer, for example, or by the spin coating of an ultraviolet curable resin which is then cured by irradiation with ultraviolet light.

As shown in FIG. 9(B), the super-resolution multi-layer film 21 has a laminated structure including a dielectric layer 211, a layer of nonlinear material 212, another dielectric layer 213, a recording layer 214, and yet another dielectric layer 215.

The recording layer 214 includes, for example, a platinum oxide ($PtO_x$), silver oxide ($AgO_x$), palladium oxide ($PdO_x$) or other noble metal oxide layer. The recording layer 214 is several nanometers to several hundred nanometers thick. The layer of nonlinear material 212 may be formed from a material in Ge—Sb—Te family, Ag—In—Sb—Te family, Sb—Te family, or In—Sb family. When a high intensity recording laser beam is focused onto the recording layer 214, the recording layer 214 absorbs the energy from the laser beam and is locally pyrolized and distorted. This forms recorded marks (bubble pits) 214a to 214d smaller than the diffraction limit $\lambda/(4NA)$ defined by the NA of the focusing optical system 25 and the wavelength λ of the laser beam 26. When the focused laser beam is a reproducing laser beam, in the layer of nonlinear material 212, a super resolution phenomenon is thought to occur in which an optical characteristic changes in a local area smaller than the diffraction limit and localized light is generated. The localized light interacts with the recorded marks 214a to 214d and is converted to reproducing light (propagating light).

The dielectric layers 211, 213, 215 function, for example, to prevent thermal diffusion of the constituent materials of the recording layer 214 and nonlinear layer 212. The dielectric layers 211, 213, and 215 may be formed from $ZnS-SiO_2$ or AlN, for example. Provision of the dielectric layers 211, 213, 215 can improve the reproduction durability of the recording layer 214 and the layer of nonlinear material 212. If necessary, the super-resolution multi-layer film 21 may include an interference layer to produce optical multiple interference.

Alternatively, the super-resolution multi-layer film 21 may include a dielectric layer 216, a recording layer 217, another dielectric layer 218, a super-resolution mask layer 219, and yet another dielectric layer 220, as shown in FIG. 9(c). The recording layer 217 may be made of, for example, platinum oxide ($PtO_x$) or silver oxide ($AgO_x$) as in the example in FIG. 9(B). The super-resolution mask layer 219 may be formed from, for example, a phase change material such as a material in the Ge—Sb—Te family, Ag—In—Sb—Te family, Sb—Te family, or In—Sb family. The dielectric layers 216, 218, 220 may be formed from, for example, AlN, SiN, or another nitride material. The super-resolution mask layer 219 has an optical characteristic that changes, under illumination by a focused reproducing laser beam, in a local area smaller than the diffraction limit, forming an optical micro-aperture. Localized light generated in the micro-aperture interacts with the recorded marks 217a to 217d and is converted to reproducing light (propagating light).

The structures of the super-resolution multi-layer film 21 shown in FIGS. 9(B) and 9(C) are exemplary; there are no particular restrictions on the structure of the super-resolution multi-layer film 21, the number of its constituent films, their constituent materials, etc. For example, the super-resolution multi-layer film 21 may have a laminated structure consisting of, in the order from the light incidence surface, a dielectric layer, a super-resolution mask layer of platinum oxide ($PtO_x$) or silver oxide ($AgO_x$), another dielectric layer, a recording layer, and yet another dielectric layer, the recording layer being made from a phase change recording material such as a material in the Ge—Sb—Te family with the addition of Fe, Zn, or Bi. A nitride material such as AlN or SiN, for example, may be used to form the dielectric layers in this structure.

In the super-resolution optical disc 2 in this embodiment, as in the first embodiment, the thickness between the light incidence surface of the protective layer 22 and the recording layer 214 or 217, that is, the center value Kbc of the thickness Kb of the cover layer covering the recording layer 214 in FIG. 9(B) or the recording layer 217 in FIG. 9(C) is preferably set at 0.080 mm. In view of the tolerance ±δ (=±0.003 mm), the preferred upper limit value Kbmax of the thickness Kb of the cover layer is set as follows.

$Kb$max=0.080 mm+0.003 mm

Accordingly, the upper limit value of the thickness Kb of the cover layer of the super-resolution optical disc 2 is 0.083, or more preferably 0.080, which is thinner by 0.020 mm than the thickness (=0.1 mm) of the BD cover layer.

By optimizing the thickness Kb of the cover layer in this way, the same effects can be obtained as in the first embodiment. That is, even when the recording and reproducing of information on the recordable super-resolution optical disc 2 is performed by using a BD optical disc device (e.g., the optical disc device 100 in FIG. 2), a wide tilt margin can be secured. That is, the reduction in the maximum peak intensity of the focused spot formed in the super-resolution multi-layer film 21 and the reduction in the super-resolution effect can be restricted, thereby restricting the degradation of the reproduction resolution. A recordable super-resolution optical disc 2 capable of assuring downward compatibility with BDs can therefore be provided without increasing the production cost of the optical disc device.

The thickness Kb between the light incidence surface and the recording layer 214 or 217 is preferably made as thin as possible to reduce coma aberration, but a sufficient thickness Kb from the protective layer 22 to the recording layer 214 or 217 should be secured with regard to the fact that foreign matter, scratches, etc. on the surface of the protective layer 22 can easily degrade the reproduced signal.

The super-resolution optical disc 2 in this embodiment has a higher data recording density than BDs, so the reproduced signal is more susceptible to the effects of foreign matter and scratches on the surface of the protective layer 22. Therefore, the thickness Kb of the cover layer should not be too small. The lower limit of the thickness Kb of the cover layer is preferably set so as to satisfy the total system performance margin, including the effects of foreign matter, scratches, etc. on the surface of the protective layer 22 in the super-resolution optical disc 2. As with the super-resolution optical disc 1 in the first embodiment, in view of the graph in FIG. 8(A), the thickness Kb of the cover layer of the super-resolution optical disc 2 in this embodiment is also preferably 0.05 mm or more.

As mentioned above, the optical pickup may be equipped with a spherical aberration correction mechanism. The thickness Kb of the cover layer of the super-resolution optical disc 2 should also be set at a value of approximately 0.05 mm or more from the viewpoint of making the super-resolution optical disc 1 in this embodiment downwardly compatible with BDs while curbing excessive increase in the manufacturing cost of the spherical aberration correction mechanism.

Setting the upper limit of the thickness K of the cover layer of the recordable super-resolution optical disc 2 in this embodiment at 0.083 mm, or more preferably 0.080 mm, as described above, enables a wide tilt margin to be secured even when a BD optical disc device is used to record and reproduce information on the super-resolution optical disc 2.

Third Embodiment

Figure 10:
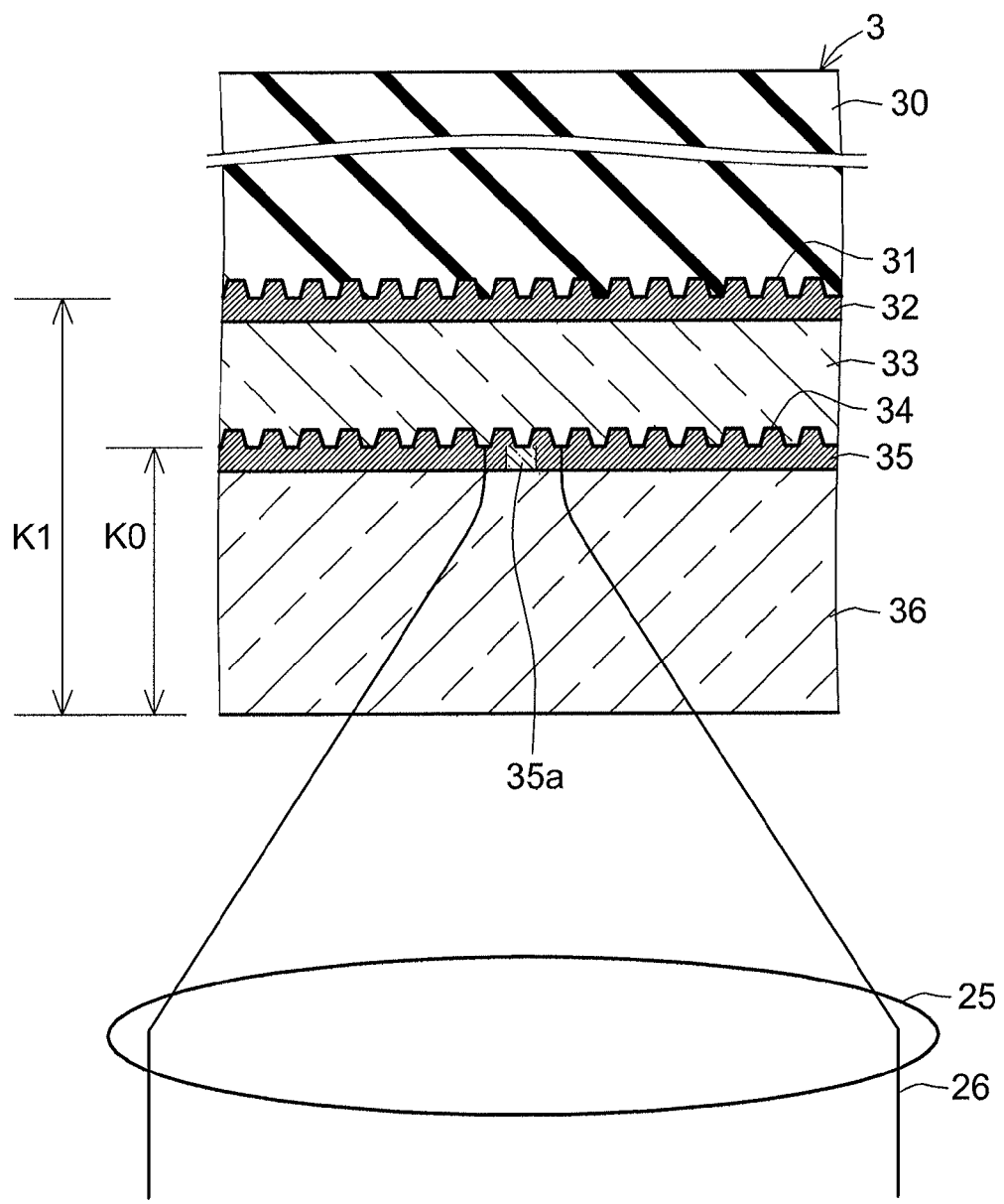
FIG. 10 is a drawing schematically showing the structure of a multi-layer super-resolution optical disc in a third embodiment, which is another variation of the first embodiment.

Next a third embodiment, which is a second variation of the first embodiment, will be described. The super-resolution optical disc 1 (FIG. 1) in the first embodiment has a single recording layer 11, but this is not a limitation. FIG. 10 is a drawing schematically showing the structure of a super-resolution optical disc 3 of the multi-layer type in the third embodiment.

The super-resolution optical disc 3 in the third embodiment has two recording layers 31 and 34, but this is not a limitation; it may have three or more recording layers. Increasing the number of recording layers can greatly increase the amount of data that can be recorded in a single disc, making it possible to record or reproduce more video data, or video data providing higher image quality. The number of recording layers may be determined on the basis of market needs and disc manufacturing cost.

As shown in FIG. 10, the super-resolution optical disc 3 includes a substrate 30 of polycarbonate, glass, or the like, a recording layer 31 formed on the substrate 30, a super-resolution functional layer 32 formed adjacent the recording layer 31, an intermediate layer 33 covering the recording layer 31 and super-resolution functional layer 32, another recording layer 34 formed on the intermediate layer 33, another super-resolution functional layer 35 formed on the recording layer 34, and a protective layer 36 covering the recording layer 34 and super-resolution functional layer 35. The intermediate layer 33, recording layer 34, super-resolution functional layer 35, and protective layer 36 consist of a material that transmits a laser beam 26 focused by the focusing optical system 25 of an optical pickup. The protective layer 36 may be formed by the bonding of a thin light-transmitting resin sheet with a light transmitting adhesive layer, for example, or by the spin coating of an ultraviolet curable resin which is then cured by irradiation with ultraviolet light.

The recording layers 31 and 34 may have the same structure as the recording layer 11 in the first embodiment, but recording layer 34, which is interposed between the recording layer 31 and the light incidence surface of the protective layer 36, is made from a material that can transmit the laser beam 26. The relief pattern in recording layer 34 may be created by, for example, transferring the relief pattern of a master disc before curing the intermediate layer 33, which is made of an ultraviolet light curable resin, and then irradiating the intermediate layer 33 with ultraviolet light and thereby curing it.

The super-resolution functional layers 32, 35 may have the same function as the super-resolution functional layer 12 in the first embodiment. Super-resolution functional layer 35 has a nonlinear light absorption characteristic or nonlinear light transmission characteristic such that the refractive index or another optical characteristic varies under illumination by the focused spot of the laser beam 26. For example, an optical micro-aperture 35a is formed in super-resolution functional layer 35 when it is irradiated by the focused spot of the laser beam 26. Localized light generated in the micro-aperture 35a irradiates recording layer 34 to generate reproducing light (reflected return light). When the laser beam 26 is focused onto super-resolution functional layer 32, an optical micro-aperture (not shown) is also formed in super-resolution functional layer 32 under illumination by the laser beam 26, and localized light generated in this micro-aperture interacts with recording layer 31 and is converted to reproducing light.

For the super-resolution optical disc 3 in this embodiment, as in the first embodiment, the center value K1c of the thickness K1 from the light incidence surface of the protective layer 36 to the recording layer 31 furthest from the light incidence surface, that is, the thickness of the cover layer covering the recording layer 31 furthest from the light incidence surface, to is preferably set at 0.080 mm. In view of the tolerance ±δ (±0.003 mm), the preferred upper limit value K1max of the thickness K1 of the cover layer is set as follows.

$$K1\text{max}=0.08 \text{ mm}+0.003 \text{ mm}$$

Accordingly, the upper limit value of the thickness K1 of the cover layer of the super-resolution optical disc 3 is 0.083 mm, more preferably 0.080 mm, which is thinner than the thickness (=0.1 mm) of the cover layer of a BD by 0.020 mm.

In order to reduce coma aberration, the thickness K0 from the light incidence surface of the protective layer 36 to recording layer 34 is preferably reduced as much as possible, but a sufficient thickness K0 from the protective layer 36 to recording layer 34 should be secured with regard to the fact that foreign matter, scratches, etc. on the surface of the protective layer 36 can easily degrade the reproduced signal. The thickness K0 may be determined in consideration of factors such as the rate of occurrence of burst errors due to reproduced signal degradation. The thickness K0 can be reduced by use of a decoding method with high immunity to burst errors.

The super-resolution optical disc 3 in this embodiment also has a higher data recording density than BDs, so the reproduced signal is susceptible to the effects of foreign matter and scratches on the surface of the protective layer 22. Accordingly, the thickness K1 of the cover layer should not be too thin. The lower limit of the thickness K1 of the cover layer is preferably set so as to satisfy the total system performance margin, including the effects of foreign matter, scratches, etc. on the surface of the protective layer 36 of the super-resolution optical disc 3. As with the super-resolution optical disc 1 in the first embodiment, in view of the graph in FIG. 8(A), the thickness K1 of the cover layer of the super-resolution optical disc 3 in this embodiment is also preferably 0.05 mm or more.

As mentioned above, the optical pickup may be equipped with a spherical aberration correction mechanism. The thickness K1 of the cover layer of the super-resolution optical disc 3 should also be set at a value of approximately 0.05 mm or more from the viewpoint of making the super-resolution optical disc 3 in this embodiment downwardly compatible with BDs while curbing excessive increase in the manufacturing cost of the spherical aberration correction mechanism.

The thickness of the intermediate layer 33 need only be optimized to avoid interference of reflected light. A desirable thickness of the intermediate layer 33 is, for example, from 0.015 mm to 0.025 mm.

With the super-resolution optical disc 3 in the third embodiment, the same effects as in the first embodiment can be obtained by optimizing the thickness K1 of the cover layer covering the recording layer 31 furthest from the light incidence surface as described above. That is, even when the recording and reproducing information on recording layer 31 of the super-resolution optical disc 3 is performed by using a BD optical disc device (e.g., the optical disc device 100 in FIG. 2), a wide tilt margin can be secured. That is, the reduction in the maximum peak intensity of the focused spots formed in all the super-resolution functional layers (in FIG. 10, super-resolution functional layers 32 and 35) and the reduction in their super-resolution effect can be restricted, thereby restricting the degradation of the reproduction resolution. Accordingly, a multi-layer super-resolution optical disc 3 capable of assuring downward compatibility with BDs can be provided without increasing the production cost of the optical disc device 100.

Variations of the First to Third Embodiments

Although various embodiments according to the present invention have been described above with reference to the drawings, they only show examples of the invention; other modes can be adopted. For example, the super-resolution optical disc 3 (FIG. 10) in the third embodiment has a reproduce-only (read only) structure, but this is not a limitation. In a recordable super-resolution optical disc having multiple recording layers spaced apart from one another as well, the center value of the thickness of the cover layer covering the recording layer, among the multiple recording layers, that is furthest form the light incidence surface is preferably 0.080 mm, and the upper limit value of the thickness can be set at 0.083 mm (=0.080 mm+0.003 mm).

A super-resolution optical disc with a minimum pit length of 75 nm was cited to exemplify the recorded mark length in the linear density direction of the super-resolution optical disc 1 in the first embodiment, but this example is not limiting. One of the problems to be solved by the invention is degradation of tilt margin caused by reduction in the maximum peak intensity of the focused spot formed in the super-resolution functional layer(s); the invention can also solve this problem and produce the intended effects in super-resolution optical discs with recorded mark lengths shorter than 75 nm.

The super-resolution optical disc 3 in the third embodiment includes super-resolution functional layers 32, respectively adjacent the two recording layers 31, 34, but as another possible exemplary embodiment, the super-resolution optical disc may have a structure in which the super-resolution functional layer 35 nearest the light incidence surface of the super-resolution optical disc 3 is removed. The same effects as in the first embodiment can still be obtained in this case.

REFERENCE CHARACTERS 1-3 super-resolution optical disc; 10, 20, 30 substrate; 11, 31, 34 recording layer; 12, 32, 35 super-resolution functional layer; 21 super-resolution multi-layer film; 12a, 35a aperture; 13, 22, 36 protective layer; 121, 125, 213, 215, 216, 218, 220 dielectric layer; 122, 124 interference layer; 123, 219 super-resolution mask layer; 214, 217 recording layer; 214a-214d, 217a-217d recorded marks; 22 protective layer; 25 focusing optical system; 26 laser beam; 33 intermediate layer.

What is claimed is:

1. An optical information recording medium including:
at least one recording layer in which recorded marks are formed;
a super-resolution functional layer, disposed adjacent the recording layer, for being irradiated by a laser beam focused by a focusing optical system thereby to allow detection of the recorded marks being smaller than a diffraction limit determined by optical performance of the focusing optical system and a wavelength of the laser beam; and
a light transmitting layer covering the recording layer and the super-resolution functional layer, for transmitting the laser beam focused by the focusing optical system; wherein:
the light transmitting layer has a light incidence surface on which the laser beam is incident; and
if the distance between the light incidence surface and the recording layer is K, the thickness of a cover layer covering a recording layer in a prescribed optical disc is D, the optical information recording medium has a tilt margin with a limit value of $\theta_1$ when the distance K is assumed to be equal to the thickness D of the cover layer, and the prescribed optical disc has a tilt margin with a limit value of $\theta_2$, the distance K has a center value Kc determined by the following expression:

$$Kc = D \times \theta_1 / \theta_2.$$

2. The optical information recording medium of claim 1, wherein:
the thickness D of the cover layer is substantially 0.1 mm;
the tilt margin limit value $\theta_1$ is substantially 0.56 degrees; and
the tilt margin limit value $\theta_2$ is substantially 0.7 degrees.

3. The optical information recording medium of claim 1, wherein the center value Kc is 0.080 mm.

4. The optical information recording medium of claim 1, wherein the optical information recording medium is downwardly compatible with the prescribed optical disc.

5. The optical information recording medium of claim 4, wherein the prescribed optical disc is a Blu-ray disc.

6. The optical information recording medium of claim 3, wherein the distance K between the light incidence surface and the recording layer is 0.05 mm or more.

7. The optical information recording medium of claim 6, wherein:
the wavelength of the laser beam has a nominal value of 405 nm; and
one of optical parameters representing the optical performance of the focusing optical system is a numerical aperture having a nominal value of 0.85.

8. The optical information recording medium of claim 1, wherein:

the at least one recording layer comprises multiple recording layers; and the distance K is the thickness between the light incidence surface and a recording layer furthest from the light incidence surface, among the plurality of recording layers.

9. A drive device comprising: the optical information recording medium of claim 1 a light source that emits a laser beam;

the focusing optical system that focuses the laser beam onto the optical information recording medium;

a light receiving element for detecting reflected light from the optical information recording medium;

a light guiding optical system for guiding the reflected light from the optical information recording medium to the light receiving element; and a signal processor for carrying out signal processing on an output of the light receiving element to generate a reproduced signal, wherein the focusing optical system, the light source, the light receiving element, the light guiding optical system and the signal processor are also used for recording and/or reproducing of information on the prescribed optical disc.

10. The optical information recording medium of claim 1, wherein the center value Kc is 0.080 mm.

11. The optical information recording medium of claim 10, wherein the distance K between the light incidence surface and the recording layer is 0.05 mm or more.

12. An optical information recording medium including:

a plurality of recording layers in which recorded marks are formed;

a super-resolution functional layer for being irradiated by a laser beam focused by a focusing optical system thereby to allow detection of the recorded marks being smaller than a diffraction limit determined by optical performance of the focusing optical system and a wavelength of the laser beam; and a light transmitting layer covering the recording layers and the super-resolution functional layer, for transmitting the laser beam focused by the focusing optical system; wherein:

the light transmitting layer has a light incidence surface on which the laser beam is incident; and a distance between the light incidence surface and a recording layer furthest from the light incidence surface among the plurality of recording layers is equal to or less than 0.083 mm.

13. An optical information recording medium including:

at least one recording layer in which recorded marks are formed;

a super-resolution functional layer for being irradiated by a laser beam focused by a focusing optical system thereby to allow detection of the recorded marks being smaller than a diffraction limit determined by optical performance of the focusing optical system and a wavelength of the laser beam; and a light transmitting layer covering the recording layer and the super-resolution functional layer, for transmitting the laser beam focused by the focusing optical system; wherein:

the light transmitting layer has a light incidence surface on which the laser beam is incident;

a distance between the light incidence surface and the recording layer is equal to or less than 0.083 mm; and the optical information recording medium is downwardly compatible with a Blu-ray disc.

* * * * *